US005366720A

United States Patent [19]
Caglione et al.

[11] Patent Number: 5,366,720
[45] Date of Patent: Nov. 22, 1994

[54] PROCESS FOR PREPARING LOW SILICA FORMS OF ZEOLITES HAVING THE FAUJASITE TYPE STRUCTURE

[75] Inventors: Alex J. Caglione, Nyack; Thomas R. Cannan, Congers; Nanette Greenlay, Putnam Valley; Richard J. Hinchey, Thornwood, all of N.Y.

[73] Assignee: UOP, Des Plaines, Ill.

[21] Appl. No.: 171,801

[22] Filed: Dec. 23, 1993

[51] Int. Cl.$^5$ .............................................. C01B 33/34
[52] U.S. Cl. ........................... 423/713; 423/DIG. 21
[58] Field of Search ...................... 423/713, DIG. 21; 502/63, 79, 85

[56] References Cited

U.S. PATENT DOCUMENTS

| | | | |
|---|---|---|---|
| 3,130,007 | 4/1964 | Breck | 423/DIG. 21 X |
| 3,607,043 | 9/1971 | McDaniel et al. | 423/DIG. 21 X |
| 4,333,859 | 6/1982 | Vaughan et al. | 423/DIG. 21 X |
| 4,550,092 | 10/1985 | Chang et al. | 502/71 |
| 4,576,805 | 3/1986 | Chang et al. | 423/DIG. 21 X |
| 4,603,040 | 7/1986 | Kuznicki et al. | 423/DIG. 21 X |
| 5,118,482 | 6/1992 | Narayana et al. | 423/713 |
| 5,238,676 | 8/1993 | Roth et al. | 423/713 |

*Primary Examiner*—Mark L. Bell
*Assistant Examiner*—David R. Sample
*Attorney, Agent, or Firm*—Thomas K. McBride; Richard G. Miller; Frank S. Molinaro

[57] ABSTRACT

Low silica forms of faujasite-type zeolites are prepared from more siliceous forms of the same zeolite species by contacting the starting zeolite with a highly caustic concentrated sodium aluminate solution at elevated temperatures. In view of the fact that the process does not favor the formation of undesirable impurity phases such as zeolite A and thus does not require the presence of zeolite A nucleation inhibitors, the process is particularly advantageous in the production of forms of zeolite X having $Si/Al_2$ molar ratios below 2.5.

6 Claims, No Drawings

PROCESS FOR PREPARING LOW SILICA FORMS OF ZEOLITES HAVING THE FAUJASITE TYPE STRUCTURE

FIELD OF THE INVENTION

The present invention relates in general to the preparation of low-silica forms of zeolites having the faujasite type of crystal structure, and more particularly to the preparation of zeolite X having a framework $Si/Al_2$ of less than 2.3 by reconstitution in the direction of a lower $Si/Al_2$ ratio of the framework of a precursor zeolite having the faujasite crystal structure and a higher $Si/Al_2$ ratio. The increase in the proportion of $AlO_2^-$ tetrahedra per average unit cell is achieved by treating the starting zeolite with a sodium aluminate solution at elevated temperature.

BACKGROUND OF THE INVENTION

A considerable number of crystalline zeolitic alumino-silicates, both naturally-occurring and synthetic, are known in the art. Having crystal structures formed by the corner-sharing of $SiO_2$ and $AlO_2$ tetrahedral units, some zeolite species are known in which the $Si/Al_2$ ratio of the as-crystallized lattice is as low as 2.0 and others in which the $Si/Al_2$ ratio is as high as several hundred. In accordance with the now generally-accepted theory expressed by Loewenstein's rule [Amer. Mineralog. (1954) 39, 92] $AlO_2$ tetrahedra are joined only to $SiO_2$ tetrahedra, and hence the $Si/Al_2$ ratios of zeolite frameworks cannot be less than 2.0. There is no theoretical restriction upon the upper limit of the $Si/Al_2$ ratio.

While certain zeolite species, for example ZSM-5, can be directly crystallized hydrothermally to have a very wide range of $Si/Al_2$ ratios, i.e., 5 to >200, others such as the synthetic faujasites represented by the zeolite X-zeolite Y continuum have been limited to the relatively small range of 2.0 to about 6 for the as-crystallized compositions. A particular cesium-containing zeolite, CSZ-3, said to have the faujasite type of crystal structure, has been reported in which the as-synthesized form has a $Si/Al_2$ ratio of as high as 7.0. Heretofore, attempts to change the as-crystallized $Si/Al_2$ ratios, particularly in the case of the low-silica species, have been toward increasing the $Si/Al_2$ ratios. The earlier efforts involved hydrolysis and extraction of framework aluminum to yield a more siliceous but defect-containing crystal lattice. More recently, procedures generally referred to as secondary synthesis have employed silicon tetrahalides or fluorosilicate salts to extract framework aluminum atoms and substitute in their stead silicon atoms. The primary goals of these investigations were to improve the hydrothermal stability of the crystal lattice and decrease the number of acidic sites associated with the $AlO_2$ tetrahedra in order to render the catalytic activity more selective, particularly for hydrocarbon conversion reactions.

It is not always the case, however, that the more siliceous forms of the faujasite crystal structure provide superior performance. In certain common adsorption-separation processes, such as air separation, the basis for selective adsorption of one or more of the components of the mixture to be separated is the interaction of the local electrostatic fields in the zeolite with molecules of the mixture possessing permanent dipole or quadrupole moments. These interactions are extraordinarily complex and require, inter alia, that the particular combination of cation species making up the cation population of the zeolite be optimized in view of the various components of the mixture to be separated and the process conditions imposed. It is found that maximizing the number of cation sites in the zeolite adsorbent is often advantageous and accordingly it is necessary in such cases to maximize the number of $AlO_2^-$ tetrahedral units in the zeolite.

Zeolite X, having large pores interconnecting large internal cavities, and thus having the potential for adsorbing large amounts of selectively adsorbed molecules, is widely used in adsorption processes in which crystal degradation due to acid attack or hydrothermal abuse is not a significant problem. In addition the crystal structure of zeolite X permits its formation by hydrothermal crystallization in a form in which the number of $AlO_2$ tetrahedra are essentially the same as the number of $Si_2$ tetrahedra, i.e., the framework $Si/Al_2$ ratio is about 2.0. In the synthesis of zeolite X, and also of the more siliceous zeolite Y, a variety of reagents can supply the silicon and aluminum incorporated into the crystal lattice as the tetrahedral oxide units. Suitable silicon-containing reagents include silica gel, silica acid, aqueous silica sols, amorphous solid silica and sodium silicate. Suitable aluminum-containing reagents include activated alumina, gamma alumina, aluminum trihydrate and sodium aluminate. The reagents within each group are not, however, exact equivalents, i.e., a zeolite product having a given $Si/Al_2$ ratio and degree of purity cannot necessarily be prepared under identical reaction conditions and reagent proportions with each of the aforementioned sources of silica and alumina. There are, moreover, significant differences in the costs of raw materials so that some reagents are much preferred over others for the commercial manufacture of zeolites. In the case of zeolite X it has also been found that the reaction mixtures which can result in products having $Si/Al_2$ ratios below about 2.5 are also capable of forming zeolite A as an impurity phase. To inhibit nucleation of the zeolite A structure, it is commonly the practice to include substantial amounts of potassium ions in addition to the usual sodium ions. The use of potassium ions has the disadvantage of adding to the cost of the synthesis mixture. It also results in a significant portion of the cation sites of the zeolite X product being occupied by potassium cations. In some instances the presence of these potassium cations is undesirable for the intended adsorption process, necessitating their removal by a post-synthesis ionexchange.

SUMMARY OF THE INVENTION

It has now been discovered that the framework $Si/Al_2$ molar ratio of a zeolite having the faujasite structure and having a framework $Si/Al_2$ molar ratio of greater than 2.0 can be decreased by the process which comprises incorporating aluminum atoms as $AlO_2^-$ units into the crystal lattice of the starting zeolite by contacting said zeolite with an aqueous sodium aluminate solution containing at least some extraneous sodium aluminate and having a composition, in terms of mole ratios of oxides, of $H_2O/Na_2O = 10$ to 100, preferably 10 to 30.

$Na_2O/Al_2O_3 =$ at least 1.0, preferably at least 1.2, and more preferably between 1.2 and 8.0 at a temperature of from 25° C. to 200° C. for a period of time sufficient to permit the incorporation of extraneous aluminum into the zeolite framework, preferably at least 0.5 hours, and recovering a faujasite type zeolite product having a lower framework Si/Al$_2$ ratio.

DETAILED DESCRIPTION OF THE INVENTION

As used herein and in the appended claims, the term faujasite type zeolites refers to zeolites which have the crystal structure denominated FAU in "ATLAS OF ZEOLITE STRUCTURE TYPES," W. M. Meier et al, published by the Structure Commission of the International Zeolite Association (1987). Members of this zeolite type include the mineral faujasite, zeolite X, zeolite Y, and zeolite CSZ-3. Zeolite X and zeolite Y are described in detail and the method for their synthesis disclosed in U.S. Pat. No. 2,882,244 and U.S. Pat No. 3,130,007, respectively. Zeolite CSZ-3 and its preparation are disclosed in U.S. Pat. No. 4,333,859. Any of these zeolites can be employed as the starting material in the process of the present invention, it being necessary only that their initial framework Si/Al$_2$ ratio be greater than 2.0.

As will be demonstrated by the data appearing hereinbelow, it is possible by means of the present process to make very substantial reductions in the Si/Al$_2$ ratio of the starting zeolite, for example from 2.50 to 2.05. Without wanting to be bound by any particular theory, it appears that the transformation of the starting zeolite towards lower Si/Al$_2$ ratios occurs: a) without destruction of the original crystals, but likely with some surface erosion; b) more or less uniformly throughout the entire framework of particular zeolite crystals; c) by reaction between the solid and the solution that results in aluminum enrichment of the surface volume element of the crystal; d) followed by redistribution of this aluminum and its associated framework charge throughout the crystal via a mechanism of dynamic internal hydrolysis. Upon exposure to aqueous solutions containing extraneous caustic aluminate, i.e., sodium aluminate in addition to that produced by the dissolution of the relatively small amounts of the starting zeolite under the high pH conditions of the process, the surface of the starting crystals is not only unstable relative to a lower Si/Al$_2$ ratio but is also able to respond kinetically to the chemical stress by undergoing atomic displacements that require relatively low activation energies, e.g., the reaction of Al(OH)$_4$$^-$ ions with framework Si—O—Si linkages to form framework Si—O—Al—O—Si linkages. The resulting aluminum-enriched surface is unstable, due specifically to its high framework charge relative to that of the bulk crystal. The repulsion between like charges drives the mechanism for redistribution of aluminum via migration within the lattice. Thus, once the surface itself has been enriched with aluminum the subsequent adjustment of the overall crystal composition is independent of the solution phase composition. This adjustment may occur by the hydrolysis of framework aluminum sites to create hydroxy nest framework vacancies which then migrate through the crystal lattice in a manner favoring the disruption of silicon-rich framework domains. The reinsertion of non-framework aluminum species into these vacancies effects the observed overall reduction in framework Si/Al$_2$ ratios.

Whatever the mechanism, the starting faujasite-type zeolite is advantageously employed in its as-synthesized form, i.e., without having undergone any of the well-known modification procedures such as ion-exchange, steaming, acid extraction or treatments with chelating agents. It is possible at least in some instances, to treat the as-synthesized starting material by adding the sodium aluminate reagent to the synthesis mixture and mother liquor in the crystallizer. Alternatively, the process of the present invention is readily carried out using the zeolite solids recovered from the original synthesis. The recovered starting material can have been subjected to the usual washing and drying procedures.

The manner of contacting the starting zeolite with the sodium aluminate solution is not critical. Preferably the zeolite solids are slurried in the aqueous sodium aluminate in apparatus adapted to prevent the loss of water by evaporation. The slurry can be maintained quiescently or stirred over some or all of the contact period. The temperature of the reaction system is maintained substantially in the range of 25 to 200° C., but is preferably in the range of 35° C. to 100° C., It will be understood that at the higher temperatures the conversion of the faujasite crystal structure to the crystal structure of zeolite B, sodalite and/or dense zeolite phases is facilitated and accordingly care should be taken to avoid unduly long contact times at the higher temperatures.

It is an important aspect of the present process that the sodium aluminate in contact with the zeolite being treated contain extraneous aluminate ions. As is well known in the art, zeolite X will dissolve slightly in high pH aqueous caustic solutions at temperatures within the range of the present process to produce equilibrium concentrations of aluminum in the liquid phase of a few hundred parts per million (wt.). See in this regard A. Cizmek et al, ZEOLITES 1991, Vol. 11, November/December at page 811, wherein it is reported that the equilibrium concentration of aluminum in the liquid phase during the dissolution of zeolite X (Si/Al$_2$=2.44) in 2M NaOH at temperatures in the range of 65° C. to 80° C. is about 0.014 mol/dm$^3$. In carrying out the present process the aluminum concentration in the treating solution must at least exceed the equilibrium aluminum concentration developed in situ by the slight dissolution of the starting zeolite in the caustic sodium aluminate treating solution. Accordingly, as used herein the term extraneous sodium aluminate is intended to mean sodium aluminate in excess of that normally developed in situ. Preferably a relatively large amount of extraneous aluminum is present, i.e., the molar ratio of Na$_2$Al$_2$O$_3$ is in the range of 1.2 to 8.0. The proportions of starting zeolite and sodium aluminate solution will vary depending upon the Si/Al$_2$ ratios of the starting zeolite and the desired product. Of course sufficient sodium aluminate solution must be employed to obtain the degree of aluminum enrichment of the crystal lattice required, but large excesses of aluminum required for stoichiometric conversion are not harmful to the process. A contact period of from about 1 to 100 hours is suitably employed, although contact periods of unduly long duration can give rise to undesirable crystal degradation and/or recrystallization to form non-faujasite type zeolites.

Following the reaction between the starting zeolite and sodium aluminate, the product zeolite is isolated in the conventional manner and washed to remove non-zeolitic impurities.

The invention is illustrated by the following examples. In determining the extent of framework aluminum enrichment achieved by the various experimental procedures reported, the starting zeolite and the zeolite product were subjected to conventional bulk chemical analysis for silicon and aluminum. These analytical results are reported as molar $Si/Al_2$ ratios. To confirm that additional aluminum was, in fact, incorporated into the crystal lattice, unit cell dimensions, $a_o$, were also determined using x-ray analysis. The correlation between the $a_o$ value and the proportions of $SiO_2$ and $AlO_2$ tetrahedral units in the faujasite-type crystal structure has been reported on several occasions by various investigators. Since analytical techniques have a bearing on the exact correlation obtained, minor differences occur in the reported data.

EXAMPLE 1

(a) A caustic sodium aluminate solution was prepared by combining 109.6 grams $H_2$, 71.6 grams of a 50% aqueous NaOH solution and 99.2 grams of a commercial alumina trihydrate (Alcoa C-31) in a 500 ml pyrex container, heating the mixture until all of the solids had dissolved, and then cooling to ambient room temperature. The final solution had a $H_2O/Na_2O$ molar ratio of 23.3 and a $Na_2O/Al_2O_3$ molar ratio of 1.41.

(b) Using the same procedure and reaction conditions as in part (a) above 239 grams of a sodium zeolite X having an initial bulk $Si/Al_2$ ratio of 2.73 ($a_o$=24.939 Å) were reacted with one half of the sodium aluminate solution prepared in part (a) after being slurried in 1161 grams $H_2O$. The isolated zeolite X product was found to have a bulk $Si/Al_2$ ratio of 2.42 as indicated by an $a_o$ value of 24.988 Å.

EXAMPLE 2

(a) A sodium aluminate solution having a $Na_2O/Al_2O_3$ molar ratio of 6.0 and an $H_2O/Na_2O$ molar ratio of 38 was prepared by dissolving 19.5 grams of alumina trihydrate in 120 grams of a 50% aqueous NaOH solution and diluting the product solution with 439 grams $H_2O$.

(b) Using 90 grams of the diluted sodium aluminate solution prepared in part (a) of this example, a slurry of 14.3 grams of a fully hydrated zeolite X having a $Si/Al_2$ ratio of 2.32 as determined by chemical analysis ($a_o$=24.992 Å) was prepared and digested at a temperature of 95° C. for about 70 hours. The solids were recovered by filtration and washed with water. By chemical analysis the zeolite X product was determined to have a $Si/Al_2$ ratio of about 2.18 and by x-ray analysis the $a_o$ was found to be 25.042 Å.

(c) In 90 grams of the same sodium aluminate solution as in part (b) above, 14.3 grams of a fully hydrated sodium zeolite X having a $Si/Al_2$ ratio of 2.48 as determined by chemical analysis ($a_o$=24.981 Å) were digested at 95° C. for about 70 hours. The recovered zeolite X product was found to have a $Si/Al_2$ ratio of 2.25 as determined by chemical analysis ($a_o$=25.032).

EXAMPLE 3

(a) The procedure of this part (a) of the example is a simulation of the process embodiment in which an as-synthesized zeolite X is treated with sodium aluminate while still combined with the mother liquor of the synthesis system. The sodium aluminate solution was prepared by dissolving 30 grams of alumina trihydrate in 183 grams of a 50% aqueous NaOH solution and diluting the initial solution with 425 grams $H_2O$ to produce a final solution having an $Na_2O/Al_2O_3$ molar ratio of 6.0 and a $H_2O/Na_2O$ molar ratio of 26.9. The zeolite employed was a sodium zeolite X having an as-synthesized $Si/Al_2$ ratio of 2.38 ($a_o$=24.990). The simulated mother liquor composition was formed by combining 7.2 grams of an aqueous sodium silicate solution having the composition 9 wt. % $Na_2O$, 29 wt. % $SiO_2O$ and 62 wt. % $H_2O$, with 300 grams of the aforementioned sodium aluminate solution. To 102.4 grams of the gel which immediately formed was added 17.6 grams of the previously prepared zeolite X (LOI=43.3 wt. %) and the resultant mixture digested at 95° C. for 48 hours. The zeolite product was recovered by filtration and analyzed by x-ray diffraction to determine that it was a substantially pure sodium zeolite X having an $a_o$ of 25.063 Å. By bulk chemical analysis the $Si/Al_2$ molar ratio was 2.15.

(b) Using the same sodium aluminate solution and the 2.38 NaX zeolite as in part (a) above, three separate compositions were formed by admixing in each instance 17.6 grams of the zeolite X and 100 grams of the sodium aluminate. The three compositions were each digested at 95° C. After 22 hours the zeolite was recovered from the first composition and found to have an $a_o$ of 25.049 Å and a bulk chemical $Si/Al_2$ molar ratio of 2.17. After 48 hours, the zeolite of the second composition was similarly recovered and analyzed and found to have an $a_o$ of 25.059 Å A and a bulk $Si/Al_2$ molar ratio of 2.17. The zeolite of the third composition was examined after 72 hours and determined to have an $a_o$ of 5.062 and a bulk chemical $Si/Al_2$ molar ratio of 2.13. All three zeolite products were substantially pure sodium zeolite X.

EXAMPLE 4

To investigate the effects of changes in the $Na_2O$ concentration and the amount of alumina present in excess of stoichiometric provided by the sodium aluminate solution, samples of the same sodium zeolite X having a starting $Si/Al_2$ molar ratio of 2.38 were each digested quiescently in sealed reactors at 95° C. in portions of a particular sodium aluminate solution diluted with various amounts of water. The base sodium aluminate solution was prepared by dissolving 156.0 grams of alumina trihydrate in 823.6 grams of a 50% aqueous NaOH solution. Five reaction mixtures were prepared by first placing 45 grams (hydrated basis) of the zeolite X in each of five sealable containers. The water of dilution was added to each container to form a slurry with the zeolite and thereafter the appropriate amount of the base sodium aluminate solution was added and mixed thoroughly. The containers were sealed and digested for about 24 hours. The pertinent data concerning the reaction mixtures are set forth below in tabular form:

TABLE 1

| Sample No. | 4a | 4b | 4c | 4d | 4e |
|---|---|---|---|---|---|
| Base Na Aluminate Sol., (g.) | 81.6 | 97.9 | 112.9 | 126.9 | 163.0 |
| Dilution Water, (g) | 168.4 | 152.1 | 137.1 | 123.1 | 87.0 |
| NaX zeolite, (g.) (hydrated) | 45 | 45 | 45 | 45 | 45 |

Upon recovery of the zeolite products, samples 4b, 4c, 4d and 4e were found to have essentially the same $a_o$ value of 25.06 Å, the $a_o$ value for sample 4a was 25.025 Å. A small amount (<5 wt. %) of sodalite impurity was observed in samples 4d and 4e, suggesting that the higher concentrations of $Na_2O$ result in the conversion of zeolite X product to impurity phases. Changing the relative proportions of sodium aluminate derived aluminum with respect to the starring zeolite did not appear to greatly influence the conversion rate, but may have had a stabilizing effect on the zeolite at the higher Na2O concentrations.

What is claimed is:

1. Process for decreasing the framework $Si/Al_2$ molar ratio of a zeolite having the faujasite structure and a $Si/Al_2$ molar ratio of greater than 2.0 which comprises contacting said zeolite at a temperature in the range of about 25° to about 200° C. with an aqueous sodium aluminate solution containing at least some extraneous aluminate and having a composition, in terms of mole ratios of oxides, of:

$H_2O/Na_2O = 10$ to $100$
$Na_2O/Al_2O_3 =$ at least $1.0$ and maintaining such contact until the number of aluminum atoms in the zeolite framework is increased.

2. Process according to claim 1 wherein the starting zeolite is a synthetic faujasite having a $Si/Al_2$ molar ratio of $>2.0$ to about 6.0.

3. Process according to claim 1 wherein the aqueous sodium aluminate solution has a composition in terms of mole ratios of oxides, of $H_2O/Na_2O = 10$ to $100$
$Na_2O/Al_2O_3 =$ at least $1.2$.

4. Process according to claim 2 wherein the aqueous sodium aluminate solution has a composition in terms of mole ratios of oxides of $H_2O/Na_2O = 10$ to $100$
$Na_2O/Al_2O = 1.2$ to $8.0$.

5. Process according to claim 4 wherein the starting zeolite is zeolite X having a $Si/Al_2$ molar ratio in the range of greater than 2.0 to 2.5.

6. Process according to claim 4 wherein the contact between the starting zeolite and the aqueous sodium aluminate solution is at a temperature within the range of 35° C. to 100° C.

* * * * *